United States Patent
Jagusztyn et al.

(10) Patent No.: US 7,886,537 B2
(45) Date of Patent: Feb. 15, 2011

(54) POWER GENERATION SYSTEM AND ASSOCIATED METHODS

(75) Inventors: Tadeusz Frank Jagusztyn, Fort Lauderdale, FL (US); Donald James Hay, Mission, TX (US)

(73) Assignee: CoTherm of America Corporation, Fort Lauderdale, FL (US)

( * ) Notice: Subject to any disclaimer, the term of this patent is extended or adjusted under 35 U.S.C. 154(b) by 1075 days.

(21) Appl. No.: 11/532,287

(22) Filed: Sep. 15, 2006

(65) Prior Publication Data

US 2007/0074514 A1 Apr. 5, 2007

Related U.S. Application Data

(60) Provisional application No. 60/717,534, filed on Sep. 15, 2005.

(51) Int. Cl.
*B60K 16/00* (2006.01)
(52) U.S. Cl. .................. 60/641.15; 60/641.8; 60/641.11
(58) Field of Classification Search .... 60/641.8–641.15
See application file for complete search history.

(56) References Cited

U.S. PATENT DOCUMENTS

| | | | |
|---|---|---|---|
| 3,996,919 A | 12/1976 | Hepp | |
| 4,013,062 A | 3/1977 | Laird | |
| 4,095,428 A * | 6/1978 | Warren | 60/641.8 |
| 4,159,017 A | 6/1979 | Novi | |
| 4,267,822 A * | 5/1981 | Diamond | 126/587 |
| 4,285,335 A * | 8/1981 | Simmons et al. | 126/660 |
| 4,290,413 A * | 9/1981 | Goodman et al. | 126/624 |
| 4,377,156 A * | 3/1983 | Schelzig | 126/704 |
| 4,423,599 A * | 1/1984 | Veale | 60/641.8 |
| 4,505,261 A * | 3/1985 | Hunter | 126/635 |
| 6,662,861 B2 | 12/2003 | Ozaki et al. | |
| 6,974,496 B2 | 12/2005 | Wegeng et al. | |

OTHER PUBLICATIONS www.enwave.com., Deep Lake Water Cooling System.

* cited by examiner

*Primary Examiner*—Hoang M Nguyen
(74) *Attorney, Agent, or Firm*—Mark R. Malek, Esq.; Zies Widerman & Malek

(57) ABSTRACT

A power generation system comprises a turbine and a fluid warming device in communication with the turbine. The fluid warming device may comprise a housing, an inlet pipe carried by the housing, an outlet pipe carried by the housing, and a plurality of solar collection members carried by the housing between the inlet pipe and the outlet pipe. The plurality of solar collection members may have a plurality of channels to receive fluid. The inlet pipe, the plurality of solar collection members, and the outlet pipe are in fluid communication with one another.

8 Claims, 6 Drawing Sheets

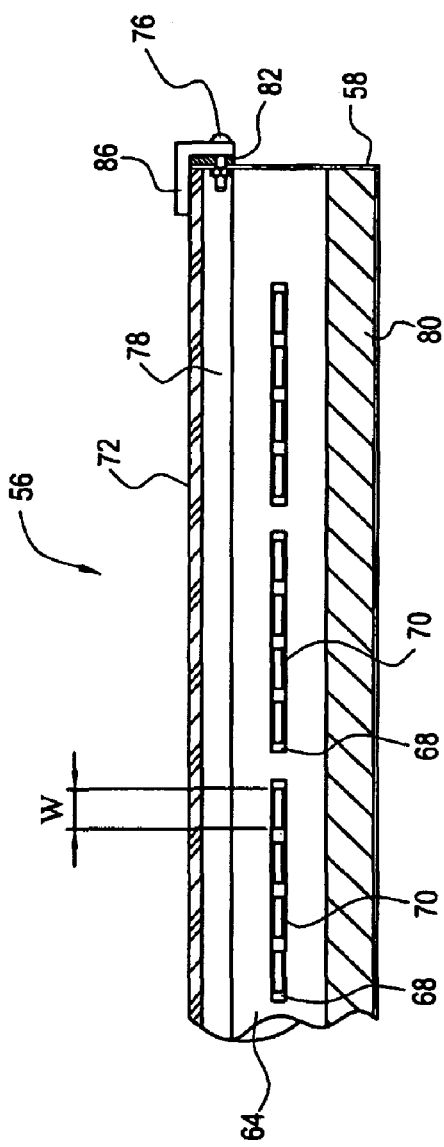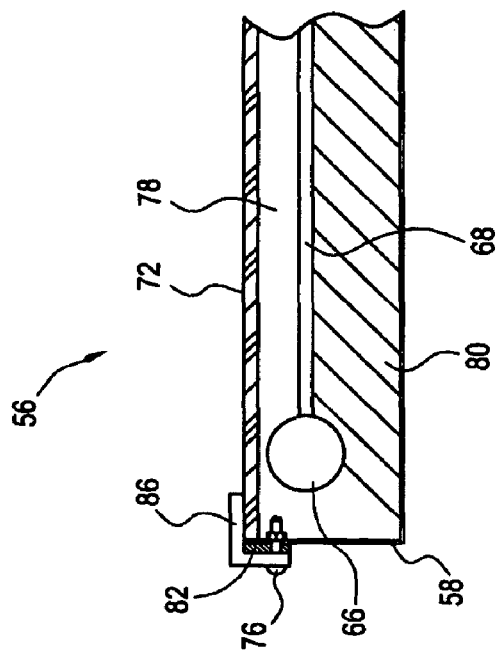

POWER GENERATION SYSTEM AND ASSOCIATED METHODS

RELATED APPLICATIONS

This application claims the benefit of U.S. Provisional Patent Application Ser. No. 60/717,534, filed on Sep. 15, 2005, and is related to co-pending U.S. patent application Ser. No. 11/532,257, titled Energy Transfer System and Associated Methods filed simultaneously herewith by the inventors of the present application, the contents of both of which are incorporated herein by reference in their entireties.

FIELD OF THE INVENTION

The present invention relates to the field of power generation and, more particularly, to the field of heating fluids to be used in a power generation process.

BACKGROUND OF THE INVENTION

Power generation systems are generally known to include a turbine, and a source of energy to rotate the turbine and generate electricity. For example, U.S. Pat. No. 6,798,079 to Nelson discloses such a turbine power generator. The energy that is used to rotate a turbine, however, may be quite costly.

Solar panels have been used to heat fluids to predetermined temperatures. For example, U.S. Pat. No. 4,159,017 to Novi discloses a solar heating panel to heat water for household purposes. U.S. Pat. No. 4,013,062 to Laird discloses a solar heat absorber including a closed box and fluid passageways carried thereby. U.S. Pat. No. 3,996,919 to Hepp discloses a system for collecting and storing solar energy.

None of these solar systems, however, are likely to warm a fluid to a temperature necessary to turn a turbine in a power generation system.

SUMMARY OF THE INVENTION

In view of the foregoing background, it is therefore an object of the present invention to provide a power generation system utilizing solar power to heat a fluid to be used to rotate a turbine and generate electricity. It is also an object of the present invention to provide a highly efficient fluid warming device to enhance fluid warming.

These and other objects, features, and advantages of the present invention are provided by a power generation system comprising a turbine, and a fluid warming device in communication with the turbine. The fluid warming device may warm a fluid to a predetermined temperature to be used to rotate the turbine.

The fluid warming device may include a housing having an inlet and an outlet formed through sidewalls thereof. The fluid warming device may also include an inlet pipe extending from the inlet substantially the length of the housing, and an outlet pipe extending from the outlet substantially the length of the housing. The fluid warming device may further include a plurality of solar collection members carried by the housing between the inlet pipe and the outlet pipe. Each plurality of solar collection members may comprise a plurality of channels to receive the fluid. The inlet pipe, plurality of solar collection members, and outlet pipe are in fluid communication with one another.

The fluid warming device may also include a cover positioned to overly the plurality of solar collectors. The fluid warming device may also comprise a pump in communication with the inlet to pump the fluid through the plurality of solar collection members.

The plurality of channels may have a width greater than one micron. In another embodiment, the plurality of channels may each have a width less than one micron. The channels advantageously enhance contact area between the fluid and the outer surface of the solar collector to thereby advantageously enhance heat transfer.

The fluid warming device may further comprise a fastener connected to the sidewall of the housing for fastening the cover to the housing. Insulation may be positioned between a top portion of the plurality of solar collection members and a bottom portion of the cover, and between a bottom portion of the plurality of solar collection members and the housing. More particularly, the insulation between the top portion of the plurality of solar collection members and the bottom portion of the cover may be provided by air. The insulation between the bottom portion of the plurality of solar collection members and the housing may be provided by polyurethane material. The fluid material may be provided by a refrigerant.

A method aspect of the present invention is for generating power. The method may comprise warming a fluid using a fluid warming device, and introducing the warmed fluid to a turbine of a power generator to rotate the turbine.

BRIEF DESCRIPTION OF THE DRAWINGS

FIG. 6 is a cross-sectional view of the fluid warming device taken through line 6-6 of FIG. 5.

FIG. 7 is a cross-sectional view of the fluid warming device taken through line 7-7 of FIG. 5.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
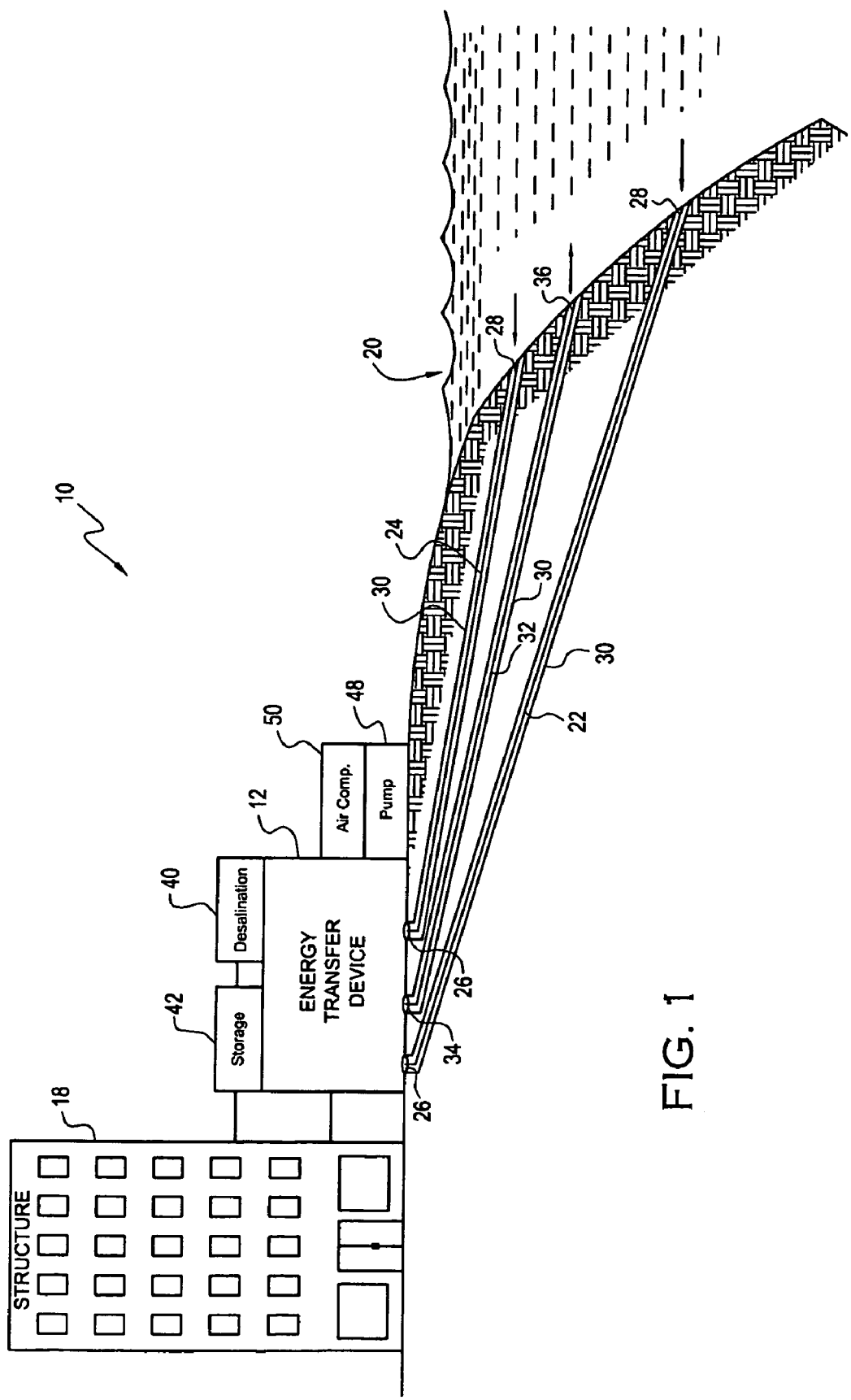
FIG. 1 is a schematic view of an energy transfer system according to the present invention.
Figure 2:
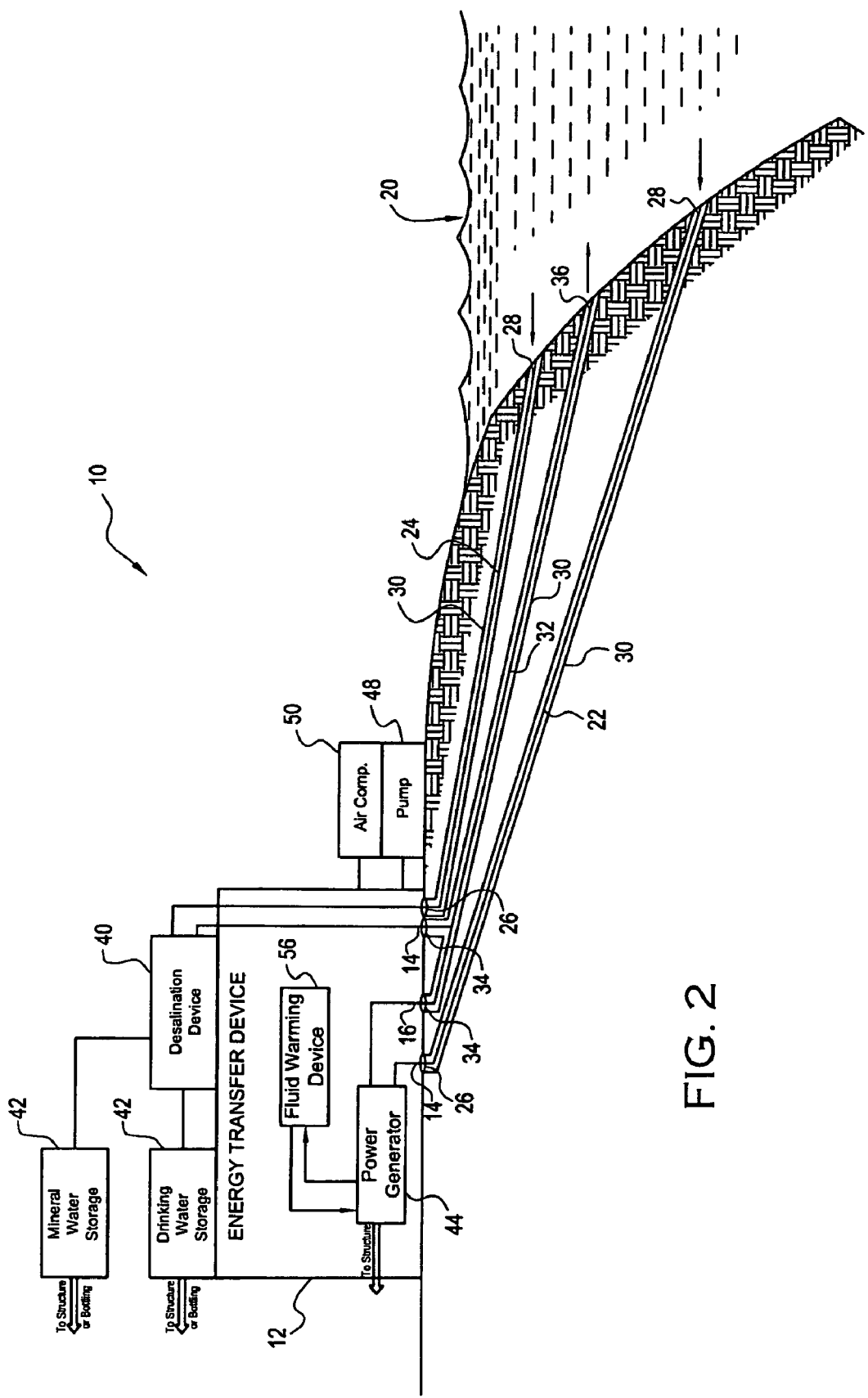
FIG. 2 is a more detailed schematic view of a first embodiment of the energy transfer system shown in FIG. 1.
Figure 3:
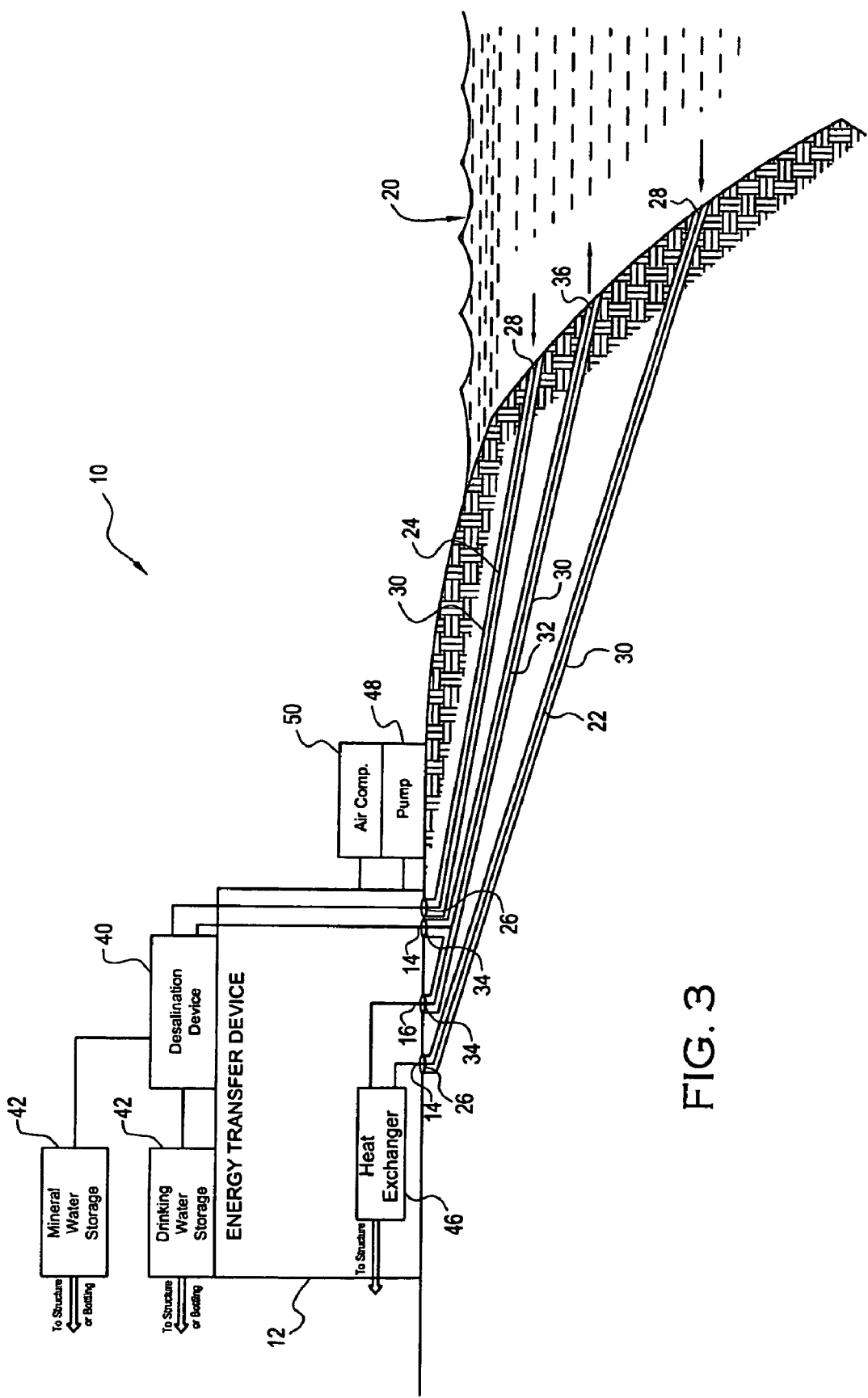
FIG. 3 is a more detailed schematic view of another embodiment of the energy transfer system shown in FIG. 1.
Figure 4:
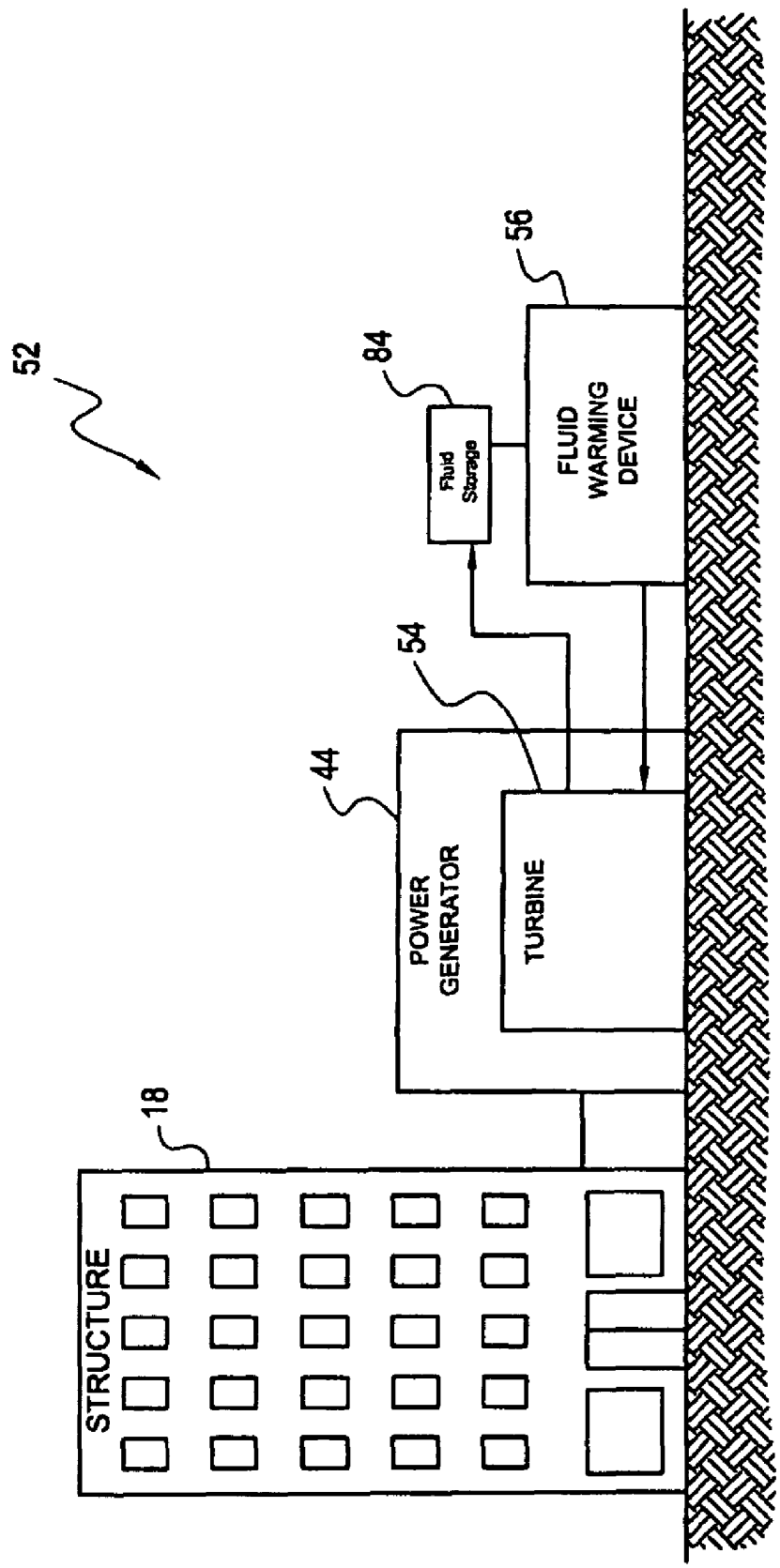
FIG. 4 is a schematic view of a power generation system according to the present invention.
Figure 5:
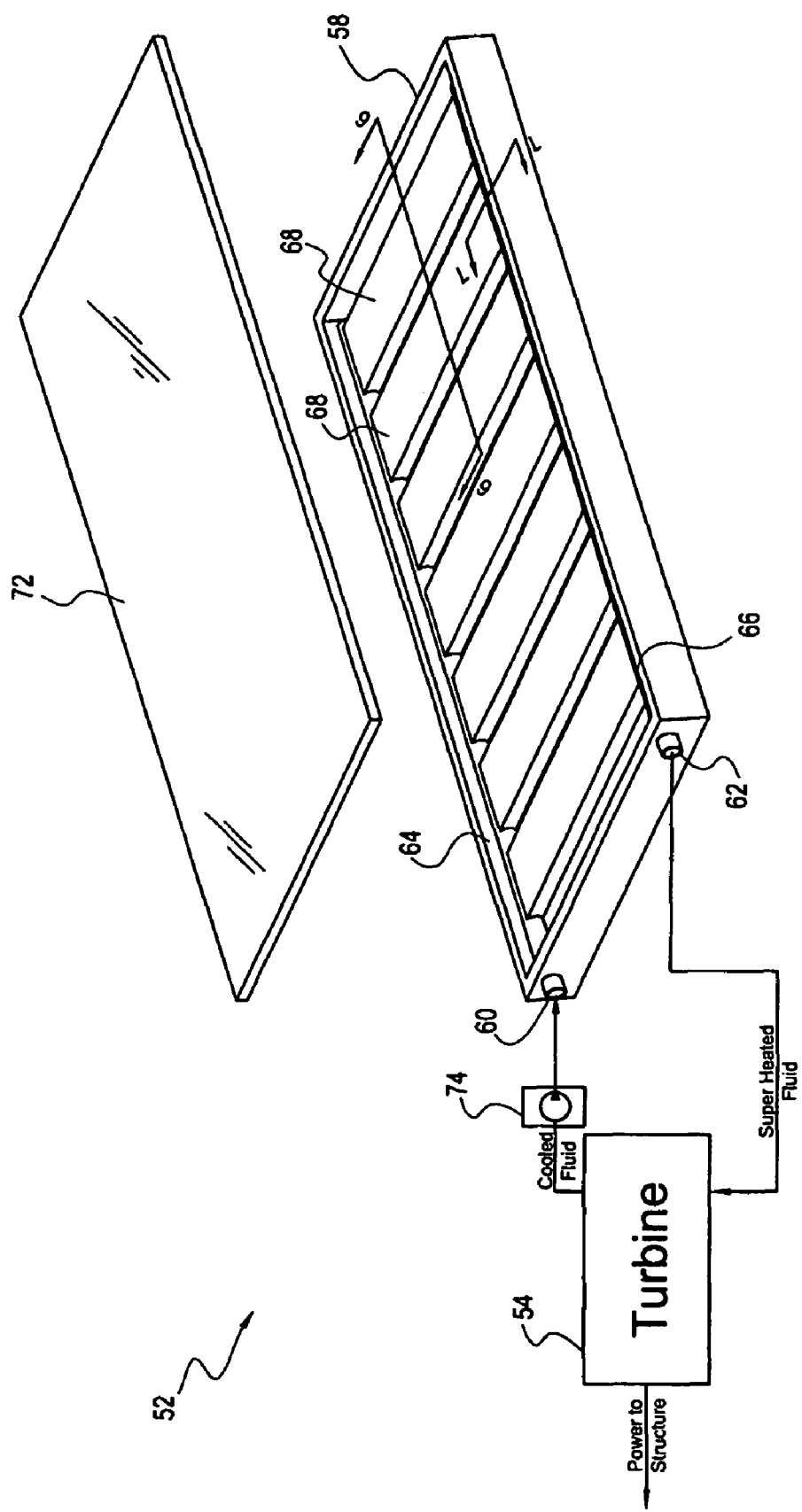
FIG. 5 is a schematic view of the power generation system illustrated in FIG. 4 and showing greater detail of the fluid warming device.

Referring to FIGS. 1-3, an energy transfer system 10 according to the present invention is now described in greater detail. The energy transfer system illustratively includes an energy transfer device 12. The energy transfer device 12 includes water inlets 14, and a water outlet 16. Although one water outlet 16 is illustrated in the appended drawings, those skilled in the art will appreciate that any number of water outlets may be provided for the energy transfer device 12.

The energy transfer device 12 is positioned adjacent a structure 18, and spaced apart from a water source 20. The structure 18 may, for example, be a hotel, or any other type of structure suitable for serving many people. The water source 20 may, for example, be a lake, an ocean, or any other body of water as understood by those skilled in the art. The present invention contemplates that the water source 20 may be close to the structure 18, i.e., less than one mile away, i.e., between one and ten miles away.

The energy transfer system 10 also includes a first water inlet pipe 22 and a second water inlet pipe 24. The first and second water inlet pipes 22, 24 each include a first end 26 connected to the water inlet 14, and a second end 28 opposite the first end and in communication with the water source 20.

The first and second water inlet pipes 24, extend within respective horizontally directionally drilled passageways 30 from the water source 20 to the water inlets 14. For ease of illustration, the horizontally directionally drilled passageways 30 are illustrated as extending downwardly from the energy transfer device 12 and outwardly through the adjacent soil to the water source 20. Those skilled in the art will appreciate, however, that generally, horizontally directionally drilled passageways will not include the vertical drop illustrated in FIGS. 1-3. Instead, it is preferable for the horizontally directionally drilled passageways 30 of the present invention to extend in a substantially horizontal direction outwardly from the structure 18 through the soil and to the water source 20.

The energy transfer system 10 also preferably includes a water outlet pipe having a first end 34 connected to the water outlet 16, and a second end 36 opposite the first end and in communication with the water source 20. Although one water outlet pipe 32 is illustrated in the appended drawings, those skilled in the art will appreciate that a plurality of water outlet pipes may be used to achieve the objects of the present invention. The water outlet pipe 32 extends within a horizontally directionally drilled passageway 30 from the water outlet 16 to the water source 20.

The first and second water inlet pipes 22, 24 are used to extract water from the water source 20 and transport the water to the energy transfer device 12. The water outlet pipe 32 may be used to discharge water from the energy transfer device 12 to the water source 20.

The first and second water inlet pipes 22, 24 extract water from the water source 20 at first and second predetermined extraction depths. The second end 36 of the water outlet pipe 32 discharges water into the water source 20 at a predetermined discharge depth. The extraction depth of the second end 28 of the first water inlet pipe 22 is preferably greater than the discharge depth of the second end 36 of the water outlet pipe 32.

More particularly, the extraction depth of the water extracted by the first water inlet pipe 22 is preferably between about 100 and 1200 meters. Further, the depth of the water extracted by the first water inlet pipe 22 is preferably within the aphotic zone of the water source 20. In other words, it is at a depth within the water source 20 where sunlight does not penetrate. Such water is preferably between the temperatures of approximately 3 and 20 degrees Celsius.

The predetermined extraction depth of the second end 28 of the second water inlet pipe 24 is preferably less than the predetermined extraction depth of the second end 28 of the first water inlet pipe 22. More specifically, the second predetermined extraction depth of the water being extracted by the second water inlet pipe 24 may be in the photic zone of the water source 20 to extract warm water therefrom. In other words, the extraction depth of the water being extracted by the second water inlet pipe 24 is preferably at a depth in the water where sunlight penetrates therethrough.

Accordingly, water extracted by the first water inlet pipe 22 is cooler than water extracted by the second water inlet pipe 24. Accordingly, cool water extracted from the water source 20 by the first water inlet pipe 22 may be used by the energy transfer device 12 to cool the adjacent structure 18. Further, warm water extracted from the water source 20 by the second water inlet pipe 24 may be used by the energy transfer device 12 to provide heat to the adjacent structure 18.

The discharge depth of the water being extracted into the water source 20 by the water outlet pipe 32 is preferably within the photic zone of the water source. Water being discharged into the water source 20 by the water outlet pipe 32 is water that has been used by the energy transfer device 12, and is suitable for discharge back to the water source. In other words, such water is not contaminated or polluted, but rather is suitable for discharge to the water source 20.

The first and second water inlet pipes 22, 24 and the water outlet pipe 32 are preferably provided by high strength piping. For example, the pipes preferably comprise ductile iron material. Those skilled in the art will appreciate that these pipes may be provided by other materials as well.

The energy transfer system 10 may also include a desalination device 40 in communication with the energy transfer device 12. The desalination device 40 desalinates water extracted from the water source 20. Of course, in cases where the water source is a fresh water source, e.g., a lake or a pond, such a desalination device 40 is not applicable. Mineral water may be discharged by the desalination device 40 as a by-product of the desalination process.

The energy transfer system 10 may also include a water storage device 42 in communication with the desalination device 40. More specifically, the water storage device 42, e.g., a water storage tank or a water pond, may be used to store the mineral water that is discharged from the desalination device 40 as the by-product of the desalination process. The mineral water may advantageously be provided to the structure, e.g., the hotel, for use by its occupants. Those having skill in the art will appreciate that mineral water is quite desirable for health purposes. Further, the mineral water may be bottled, and separately sold as desired. Similarly, water extracted by the first water inlet pipe 22, i.e., aphotic water, may also be bottled and sold as desired, as aphotic water is also mineral rich. As illustrated in FIG. 2, water may also be discharged from the desalination device 40 back into the outlet pipe 32 and into the water source 20.

Those skilled in the art will appreciate that the energy transfer system 10 of the present invention may include a plurality of storage tanks. For example, the energy transfer system 10 may include a storage tank for photic water extracted from the water source 20 by the second water inlet pipe 24. Further, the energy transfer system 10 may also include a discharge water storage tank to regulate the temperature of water before being discharged into the water source 20.

As discussed in detail above, water being discharged into the water source 20 by the water outlet pipe 32 is suitable for discharge into the water source 20. The present invention also contemplates discharging aphotic water into the photic zone of the water source 20. The mineral rich properties of the aphotic water promote sea life. Accordingly, the present invention contemplates discharging aphotic water into the photic zone of the water source 20 to advantageously enhance the growth of the sea life within the photic zone.

The energy transfer device 12 may comprise a power generator 44, as illustrated in FIG. 2, or a heat exchanger 46, as illustrated in FIG. 3. In the case of the power generator 44, the energy transfer device 12 preferably uses the temperature differences between the water extracted from the water source 20 by the first water inlet pipe 22 and the water extracted from the water source by the second water inlet pipe 24 to generate power. In the case of the heat exchanger 46, the energy transfer device 12 also advantageously uses the temperature difference of the water extracted from the water source to heat and cool the adjacent structure 18. The heat exchanger 46 may also be used in air conditioning applications, hot water applications, as well as many other applications as understood by those skilled in the art.

The present invention may also include a condenser feature wherein cool water extracted by the first water inlet pipe 22 from the water source 20 may be used to condense water from the surrounding air. The water condensed from the surrounding air may be captured in a storage device and later used for drinking water. This also advantageously assists to control humidity within the structure 18. Further, water may be condensed from the cool water extracted by the first water inlet pipe 22 by exposing the cool water to heat that is released from the air conditioning system. Again, the condensed water may be captured and retained to be used as drinking water.

The energy transfer system 10 may also comprise a pump 48 or an air compressor 50 in communication with the first and second water inlet pipes 22, 24. More specifically, the pump provides mechanical energy to extract water from the water source 20 using the first and second water inlet pipes 22, 24. Alternately, an air compressor 50 may provide an air lift system to extract water from the water source 20 using the first and second water inlet pipes 22, 24.

The energy transfer system 10 of the present invention advantageously reduces energy production costs, as well as pollution, while simultaneously enhancing generating electricity and providing heating and warming capabilities to an adjacent structure. Further, the energy transfer system 10 of the present invention is environmentally friendly as it uses an energy source that is readily renewable, i.e., aphotic water.

A method aspect of the present invention is for using an energy transfer system 10. The method may comprise positioning an energy transfer device 12 adjacent a structure 18. The method may also comprise extending a water inlet pipe 22 through a horizontally directionally drilled passageway 30 from the water source 20 to the energy transfer device 12. The method may further include extending a water outlet pipe 32 from the energy transfer device to the water source 20 through a horizontally directionally drilled passageway 30. The method may still further comprise extracting water using the water inlet pipe 22 from a predetermined extraction depth, and discharging water into the water source 20.

Referring now additionally to FIGS. 2 and 4-6, a power generation system 52 is now described in greater detail. The power generation system 52 illustratively includes a turbine 54 and a fluid warming device 56 in communication with the turbine for warming a fluid to a predetermined temperature. The warmed fluid is preferably used to rotate the turbine 54 to thereby generate electricity to be provided to the adjacent structure 18.

The fluid warming device 56 includes a housing 58. The housing preferably includes an inlet 60, and an outlet 62 formed through sidewalls of the housing. The housing is preferably made of sheet metal material, but those skilled in the art will appreciate that the housing can be made of any other material having similar properties. The fluid warming device 56 may also include an inlet pipe 64 extending from the inlet 60 substantially the length of the housing 58. The fluid warming device 56 may further include an outlet pipe 66 extending from the outlet 62 substantially the length of the housing 58.

The fluid warming device 56 also illustratively includes a plurality of solar collection members 68 carried by the housing 58 between the inlet pipe 64 and the outlet pipe 66. Each of the plurality of solar collection members 68 comprise a plurality of channels 70 to carry the fluid. The inlet pipe 64, the plurality of solar collection members 68, and the outlet pipe 66 are preferably in fluid communication with one another.

Solar collection members 68 are preferably made of aluminum or titanium. Those skilled in the art will appreciate that the solar collection members 68 may be made of any other type of material having similar lightweight properties. The present invention also contemplates the use of polymer material, such as a polycarbonate, to form the solar collection members 68. The polycarbonate material is preferably a dark color to enhance heat absorption properties. Those skilled in the art will appreciate that the solar collection members may also comprise both a clear and a dark material to further enhance the heat absorption properties.

The fluid warming device may also include a cover 72 positioned to overly the plurality of solar collection members 68. The cover 72 is preferably made of a resin material. More specifically, the cover 72 may be a transparent converter provided under the tradename Lexan®. The fluid warming device 56 may comprise a pump 74 in communication with the inlet 60 to pump the fluid through the plurality of solar collection members 68.

The channels 70 of each of the solar collection members 68 may be micro-channels or nano-channels. Micro-channels are preferably defined as having a width (depicted as "W" in FIG. 6) greater than one micron. Nano-channels are preferably defined as having a width W of less than one micron. The small width W of the channels 70 of the solar collection members 68 advantageously enhance heat absorption of the fluid as it passes through the solar collection members. Accordingly, the fluid warming device 56 of the present invention greatly decreases the amount of energy necessary to rotate a turbine 54 in a power generation system 52.

The fluid warming device 56 may also comprise a plurality of brackets 86 and fasteners 76 connected to the sidewall of the housing 68 for fastening the cover 72 to an upper portion of the housing. The brackets 86 may, for example, be L-shaped brackets, or any other type of suitable bracket. The fasteners 76 may, for example, be pop rivets. Those having skill in the art, however, will appreciate that the fasteners 76 may be provided by any other type of fastener suitable for securing the cover 72 to an upper portion of the housing 58.

As perhaps best illustrated in FIGS. 6 and 7, the fluid warming device 56 comprises insulation 78 between a top portion of the plurality of solar collection members 68 and a bottom portion of the cover 72. The insulation 78 may, for example, be air, or any other suitable insulation as understood by those skilled in the art.

The fluid warming device 56 may also include insulation 80 between a bottom portion of the plurality of solar collection members 68 and a bottom portion of the housing 58. The insulation 80 positioned below the solar collection members 68 may, for example, be provided by a polyurethane material, or any other similar material as understood by those skilled in the art. A seal 82 may be provided between the cover 72 and the housing 58. The seal 82 may, for example, be provided by weather stripping, or any other material suitable for forming a seal between the cover 72 and the housing 58. The seal 82 advantageously enhances the efficiency of the fluid warming device 56, resulting in enhanced energy savings by the power generation system 52.

The fluid used in the fluid warming device 56 is preferably a refrigerant. For example, propane may be used as a fluid in the fluid warming device 56, or any other similar refrigerant as understood by those skilled in the art. The fluid warming device 56 preferably utilizes a closed fluid system, i.e., there is no loss of fluid during use of the fluid warming device. As illustrated, for example, in FIG. 2, fluid storage 84 may be provided to store fluid used by the fluid warming device 56. The fluid storage 84 may, for example, be provided by a reservoir. Those skilled in the art will appreciate that the fluid storage 84 may also be provided by any other type of storage device.

Operation of the power generation system 52 is now described in greater detail. More particularly, the power generation system 52 is preferably a closed system. More specifically, and with reference to FIG. 5, the fluid is preferably pumped through the inlet pipe 64 into the inlet 60 of the housing 58. Thereafter, the fluid passes through the channels 70 of the solar collection members 68. Upon reaching a specific temperature, the fluid exits the channels 70 of the solar collection members 68, into the outlet pipe 66. The fluid then exits the housing 58 through the outlet 62 at a warmed temperature. More specifically, the fluid is preferably super heated upon exiting the fluid warming device 56.

The super heated fluid is used to rotate the turbine 54 of the power generation system 52 to thereby generate electricity. The electricity that is produced by the turbine 54 is provided to the adjacent structure 18. After the fluid is used by the turbine 54, it is returned to the inlet pipe 64 at a cooled temperature. Thereafter, the process starts over again as the cooled fluid is pumped back into the fluid warming device 56 through the inlet pipe 64. The fluid warming device 56 may include a plurality of headers (not shown) so that as the fluid reaches a certain temperature, the headers may re-direct the fluid to bypass channels into the outlet pipe 66 and thereafter to the turbine 54.

The power generation system 52 of the present invention greatly enhances energy conservation efforts. More specifically, the power generation system 52 greatly decreases costs associated with generating electricity. In other words, the power generation system 52 replaces typical energy sources used to rotate turbines 54, i.e., steam generation, coal, oil, etc., with an abundant source of energy, i.e., the sun.

A method aspect of the invention is for generating power. The method includes warming a fluid using the fluid warming device 56, and introducing the warm fluid to the turbine 54 of the power generation system 52 to rotate the turbine.

Another method aspect of the present invention is a method of doing business. More particularly, the method may include installing an energy transfer system 12 or a power generation system 52 adjacent a structure 18. The method may also comprise receiving a percentage of energy cost savings as payment for installation of the energy transfer system 12 or the power generation system 52.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A power generation system comprising:
   a turbine; and
   a fluid warming device in communication with said turbine for warming a fluid to predetermined temperature to be used to rotate said turbine, said fluid warming device comprising
   a housing including an inlet and an outlet formed through sidewalls thereof,
   an inlet pipe extending from the inlet substantially the length of said housing,
   an outlet pipe extending from the outlet substantially the length of said housing,
   a plurality of solar collection members carried by said housing between said inlet pipe and said outlet pipe, each of said plurality of solar collection members comprising a plurality of channels to receive the fluid, wherein each of the plurality of channels have a width greater than one micron,
   a cover positioned to overlie the plurality of solar collection members,
   at least one fastener connected to the sidewall of said housing for fastening said cover to said housing, and
   insulation between a top portion of said plurality of solar collection members and a bottom portion of said cover, and between a bottom portion of said plurality of solar collection members and said housing,
   said inlet pipe, plurality of solar collection members, and outlet pipe being in fluid communication with one another.

2. A power generation system according to claim 1 wherein said fluid warming device further comprises a pump in communication with said inlet to pump the fluid through the plurality of solar collection members.

3. A power generation system according to claim 1 wherein the insulation between the top portion of the plurality of solar collection members and the bottom portion of said cover is air; and wherein the insulation between the bottom portion of said plurality of solar collection members and said housing comprises polyurethane material.

4. A power generation system according to claim 1 wherein said fluid is a refrigerant.

5. A power generation system comprising:
   a turbine; and
   a fluid warming device in communication with said turbine for warming a fluid to predetermined temperature to be used to rotate said turbine, said fluid warming device comprising
   a housing including an inlet and an outlet formed through sidewalls thereof,
   an inlet pipe extending from the inlet substantially the length of said housing,
   an outlet pipe extending from the outlet substantially the length of said housing,
   a plurality of solar collection members carried by said housing between said inlet pipe and said outlet pipe, each of said plurality of solar collection members comprising a plurality of channels to receive the fluid, each of the plurality of channels having a width greater than one micron,
   a cover positioned to overlie said plurality of solar collectors,
   insulation between a top portion of said plurality of solar collection members and a bottom portion of said cover, and between a bottom portion of said plurality of solar collection members and said housing,
   at least one fastener connected to the sidewall of said housing for fastening said cover to said housing, and said inlet pipe, plurality of solar collection members, and outlet pipe being in fluid communication with one another, wherein said fluid is a refrigerant.

6. A power generation system according to claim 5 wherein said fluid warming device further comprises a pump in communication with said inlet to pump the fluid through the plurality of solar collection members.

7. A power generation system according to claim 5 wherein the insulation between the top portion of the plurality of solar collection members and the bottom portion of said cover is air; and wherein the insulation between the bottom portion of said plurality of solar collection members and said housing comprises polyurethane material.

8. A method of generating power, the method comprising:
   warming a fluid using a fluid warming device by pumping the fluid through the fluid warming device, the fluid warming device comprising a housing, an inlet pipe extending from an inlet in the housing substantially the length of the housing, an outlet pipe in fluid connection with the inlet pipe and extending from an outlet of the housing substantially the length of the housing, and a plurality of solar collection members carried by the housing and in fluid communication with the inlet pipe and the outlet pipe, each of the plurality of solar collection members comprising a plurality of channels to receive the fluid, wherein the fluid warming device includes a cover to overlie the plurality of solar collectors, at least one fastener connected to the sidewall of the housing for fastening the cover to the housing, and insulation between a top portion of the plurality of solar collection members and a bottom portion of the cover, and between a bottom portion of the plurality of solar collection members and the housing; and
   introducing the warmed fluid to a turbine to rotate the turbine;
wherein the fluid pumped through the solar collection members is a refrigerant;
wherein the plurality of channels each have a width greater than one micron.

* * * * *